(12) United States Patent
Koike et al.

(10) Patent No.: US 7,373,777 B2
(45) Date of Patent: May 20, 2008

(54) DIE DRIVE UNIT OF MOLDING MACHINE

(75) Inventors: Jun Koike, Sunto-gun (JP); Takaki Miyauchi, Numazu (JP); Haruhiko Kikuchi, Numazu (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/260,376

(22) Filed: Oct. 28, 2005

(65) Prior Publication Data

US 2006/0090637 A1    May 4, 2006

(30) Foreign Application Priority Data

Oct. 29, 2004  (JP) .............................. 2004-316805

(51) Int. Cl.
*B29C 45/67*  (2006.01)
*B22D 17/26*  (2006.01)

(52) U.S. Cl. .......................................... 60/560; 92/152
(58) Field of Classification Search ............... 60/560; 91/437, 156; 92/152, 179
See application file for complete search history.

(56) References Cited

U.S. PATENT DOCUMENTS

| | | | | |
|---|---|---|---|---|
| 962,705 | A | * | 6/1910 | Fielding ....................... 92/152 |
| 996,693 | A | * | 7/1911 | Webb ............................ 92/152 |
| 1,054,868 | A | * | 3/1913 | Preleuthner ................... 92/152 |
| 3,332,273 | A | * | 7/1967 | Beche ...................... 72/453.11 |
| 3,651,685 | A | * | 3/1972 | Tominaga ..................... 72/402 |
| 4,235,088 | A | * | 11/1980 | Kreiskorte ............... 72/453.18 |
| 6,821,104 | B2 | * | 11/2004 | Kubota et al. .............. 425/150 |
| 2003/0189267 | A1 | * | 10/2003 | Nishizawa et al. ........ 264/40.5 |

FOREIGN PATENT DOCUMENTS

| | | |
|---|---|---|
| CN | 1394163 A | 1/2003 |
| DE | 10316199 A1 | 4/2003 |
| JP | 10-296739 | 11/1998 |
| WO | WO 02/34498 A1 | 5/2002 |
| WO | WO 200234498 A1 * | 5/2002 |

OTHER PUBLICATIONS

Chinese Office Action; Application No. 200510119230.0, mailed Jan. 4. 2008.
English Translation of Chinese Office Action; Application No. 200510119230.0, mailed Jan. 4, 2008.

* cited by examiner

*Primary Examiner*—Thomas E. Lazo
(74) *Attorney, Agent, or Firm*—DLA Piper US LLP

(57) ABSTRACT

A die drive unit has a cylinder mechanism which hydraulically drives a piston member and an additional drive mechanism which drives the piston member by means of a drive source other than a hydraulic one. A first oil chamber is formed on one side of the piston member. A second oil chamber and a third oil chamber are formed on the other side of the piston member. The first oil chamber and the second oil chamber are connected to each other by an oil passage. The piston pressure receiving area of the first oil chamber is equal to the sum of those of the second and third oil chambers.

3 Claims, 6 Drawing Sheets

DIE DRIVE UNIT OF MOLDING MACHINE

CROSS-REFERENCE TO RELATED APPLICATIONS

This application is based upon and claims the benefit of priority from prior Japanese Patent Application No. 2004-316805, filed Oct. 29, 2004, the entire contents of which are incorporated herein by reference.

BACKGROUND OF THE INVENTION

1. Field of the Invention

This invention relates to a die drive unit used in a molding machine, such as an injection molding machine, die-casting machine, etc.

2. Description of the Related Art

A die drive unit used in a molding machine, such as an injection molding machine or die-casting machine, comprises a cylinder mechanism that is driven by, for example, oil pressure as a drive source for mold closing/opening operation. This cylinder mechanism, like a conventional commercially available cylinder mechanism, has a first oil chamber on one side (position near to a rod) of a piston and a second oil chamber on the other side (position near to a cylinder head).

In some cases, moreover, a differential circuit may be provided to reduce the amount of working fluid in the cylinder mechanism. The differential circuit is furnished with an oil passage by which the first and second oil chambers communicate with each other. A working fluid compressed by a hydraulic pump is fed into the oil passage. In the cylinder mechanism with the differential circuit, the area of the piston pressure receiving surface (hereinafter referred to as the piston pressure receiving area) of the first oil chamber is larger than that of the second oil chamber. The first and second oil chambers are connected to each other by the oil passage.

When the working fluid compressed by the hydraulic pump is supplied to the oil passage of the differential circuit, the piston moves toward, for example, the second oil chamber, depending on the difference between the respective piston pressure receiving areas of the first and second oil chambers. As this is done, some of the working fluid in the second oil chamber flows into the first oil chamber, thereby covering some of the working fluid in the first oil chamber. Thus, the pump delivery for driving the piston can be reduced, so that the pump capacity can be reduced.

Described in Jpn. Pat. Appln. KOKAI Publication No. 10-296739, moreover, is a die drive unit with a hydraulic cylinder mechanism in which a piston can be driven by an additional drive source (e.g., a drive source including a servomotor and a ball screw) other than a hydraulic one.

A proposed cylinder mechanism shown in FIG. 6, for example, has a first oil chamber 1, a second oil chamber 2, and a piston 3, which is hydraulically driven in a first or second direction. In this mechanism, the piston 3 is driven by an additional drive source 4 other than a hydraulic one so that the piston 3 can be moved at high speed or stopped accurately at a desired position.

A drive mechanism that uses a servomotor 5 and a ball screw 6 is an example of the additional drive source 4. The first and second oil chambers 1 and 2 communicate with each other by means of a differential oil passage 7. A logic valve 8 is provided in the middle of the oil passage 7. Its on-off operation is controlled by a pilot pressure. The differential oil passage 7, logic valve 8, etc. constitute a differential circuit. The logic valve 8 is opened if oil pressure is applied to the first oil chamber 1 (or if the piston 3 is moved in the first direction), and is closed if oil pressure is applied to the second oil chamber 2 (or if the piston 3 is moved in the second direction).

If the piston 3 is moved at high speed in, for example, the first direction by the additional drive source 4, the pressure in the second oil chamber 2 increases, while the pressure in the first oil chamber 1 decreases. If the logic valve 8 is open, therefore, the working fluid in the second oil chamber 2 flows into the first oil chamber 1. Since the piston pressure receiving area of the first oil chamber 1 is larger than that of the second oil chamber 2, however, the amount of the working fluid in the first oil chamber 1 becomes deficient when the piston 3 moves in the first direction. The deficiency of the working fluid can be compensated for if a complementary amount is sucked in from a tank (not shown).

In the conventional cylinder mechanism having the additional drive source 4, as described above, the complementary amount of working fluid must be sucked in from the tank as the piston 3 is moved by the drive source 4. Therefore, the mechanism requires use of an additional device such as a prefill valve. In order to reduce a pressure loss during the suction, moreover, the flow cross-sectional area of the differential oil passage 7 and the like is expected to be increased, so that the piping size increases inevitably. Since the capacity of the second oil chamber 2 is relatively large, furthermore, a large amount of working fluid must be supplied from the pump as the piston 3 is driven in the second direction, so that the pump requires a large capacity.

BRIEF SUMMARY OF THE INVENTION

Accordingly, the object of this invention is to provide a die drive unit, which obviates the use of a large-capacity pump and in which suction of a working fluid from a tank can be reduced to zero or a low level as a piston is driven by an additional drive mechanism.

According to the present invention, there is provided a die drive unit having a cylinder mechanism for driving a moving die of the molding machine, the cylinder mechanism comprising a cylinder body, a piston member housed in the cylinder body and movable along an axis of the cylinder body in a first direction and a second direction opposite thereto, a first pressure generating portion defined by one pressure receiving surface of the piston member and the inner surface of the cylinder body and configured so that the capacity thereof increases as the piston member moves in the first direction, and a second pressure generating portion defined by the other pressure receiving surface of the piston member and the inner surface of the cylinder body and configured so that the capacity thereof is reduced as the piston member moves in the first direction, the first pressure generating portion being formed of one oil chamber, and the second pressure generating portion being formed of a plurality of oil chambers.

According to this configuration, the second pressure generating portion is formed of a plurality of oil chambers, and the working fluid is expected to be supplied to only some of the oil chambers. Therefore, the piston member can be driven in the second direction with only a small amount of working fluid. Thus, the pump capacity can be reduced, so that a small-capacity pump can be used for the purpose.

In a preferred aspect of the invention, the first pressure generating portion has a first oil chamber, and the second pressure generating portion has a second oil chamber and a third oil chamber, the first oil chamber and the second oil chamber being connected to each other by an oil passage, thereby constituting a differential circuit. According to this configuration, only a small amount of working fluid is needed in driving the piston member in the first direction, so that the pump delivery can be reduced.

In an aspect of the invention, the cylinder mechanism comprises an additional drive mechanism configured to drive the piston member in the first and second directions by means of a drive source other than a hydraulic one. This additional drive mechanism drives the piston member by means of the drive source (e.g., a servomotor) other than a hydraulic one. According to this configuration, the piston member can be moved at high speed or stopped accurately at a given position with respect to the cylinder body, for example.

Preferably, according to the invention, the piston pressure receiving area of the first oil chamber should be equal to the sum of those of the second oil chamber and the third oil chamber. If the piston pressure receiving area of the first pressure generating portion is made equal to that of the second pressure generating portion, for example, an excess or deficiency of the working fluid amount that may be caused by a difference between the piston pressure receiving areas can be reduced zero or a small value when the piston member is driven by the additional drive mechanism. Accordingly, suction of the working fluid from a tank can be obviated or reduced. Thus, piping need not be provided with any auxiliary device for helping the working fluid to be sucked in. Since a pressure loss of the piping during the suction need not be considered, therefore, the piping size can be reduced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A die drive unit according to a first embodiment of the present invention will now be described with reference to FIGS. 1 to 3.

Figure 1:
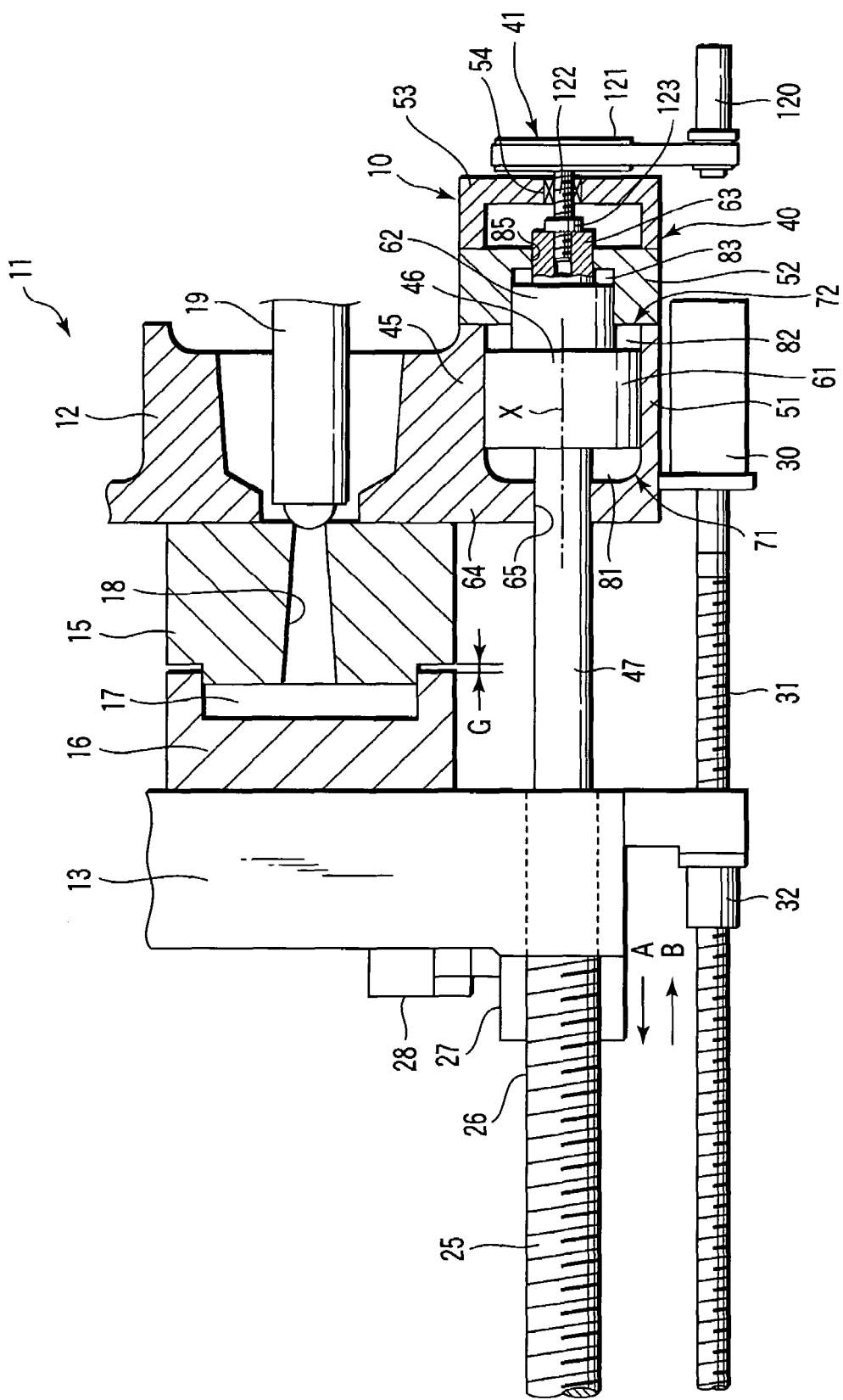
FIG. 1 is a sectional view of a part of an injection molding machine provided with a die drive unit according to a first embodiment of the invention.

FIG. 1 shows a part of an injection molding machine 11 as an example of a molding machine provided with a die drive unit 10. The injection molding machine 11 includes a fixed platen 12, a moving platen 13 as an example of a movable part, the die drive unit 10 for driving the moving platen 13, etc.

A fixed die 15 and a moving die 16 are attached to the fixed platen 12 and the moving platen 13, respectively. The moving die 16 faces the fixed die 15, and a cavity 17 for molding a material is formed between the dies 15 and 16. The fixed die 15 is formed with a material passage 18 that communicates with the cavity 17. The distal end of an injection nozzle 19 can adjoin an inlet portion of the material passage 18. The fixed platen 12 is provided with a plurality of tie bars 25 (only one of which is shown in FIG. 1) that extend parallel to one another. The moving platen 13 is movable along the tie bars 25.

An engaging portion 26 is formed on each tie bar 25. The moving platen 13 is provided with a lock member 27, such as a half-nut that can releasably engage the engaging portion 26. The lock member 27 is driven in the radial direction of the tie bar 25 by an actuator 28 such as a hydraulic cylinder. If the lock member 27 is driven by the actuator 28 in a direction to mesh with the engaging portion 26, the moving platen 13 is fixed to the tie bars 25. If the lock member 27 is driven by the actuator 28 in a direction to disengage from the engaging portion 26, the moving platen 13 and the tie bars 25 are disengaged from one another, whereupon the moving platen 13 is allowed to move in the axial direction of the tie bars 25.

A moving platen driving motor 30 is mounted on the fixed platen 12. A feed screw 31 is attached to an output shaft of the motor 30. The screw 31 extends parallel to the tie bars 25. The moving platen 13 is provided with a nut member 32. The nut member 32 is threadedly engaged with the screw 31. When the moving platen driving motor 30 rotates, therefore, the moving platen 13 is moved in the direction of arrow A or B of FIG. 1 along the tie bars 25 by the nut member 32.

The die drive unit 10 is provided with a hydraulically-driven cylinder mechanism 40 and an additional drive mechanism 41 that is driven by any other drive source than a hydraulic one. The cylinder mechanism 40 includes a cylinder body 45 on the fixed platen 12, a piston member 46 housed in the cylinder body 45, a rod 47 attached to the piston member 46. In the cylinder body 45, the piston member 46 can move in a first direction M1 (shown in FIG. 2) and a second direction M2 opposite thereto along an axis X of the cylinder body 45.

The cylinder body 45 is provided with a first cylinder portion 51 that is formed substantially integrally with the fixed platen 12, a second cylinder portion 52 attached to the first cylinder portion 51, a support member 53 attached to the second cylinder portion 52, etc. The support member 53 is provided with a bearing 54.

The piston member 46 has a first piston 61, a second piston 62, a shaft portion 63, etc. The first piston 61 and the second piston 62 may be formed substantially integrally with each other. The diameter of the second piston 62 is smaller than that of the first piston 61 and larger than that of the rod 47. The diameter of the shaft portion 63 is smaller than that of the second piston 62 and equal to that of the rod 47. The rod 47 is passed through a hole 65 that is formed in an end wall 64 of the cylinder body 45. The rod 47 is substantially continuous with the tie bars 25.

Figure 2:
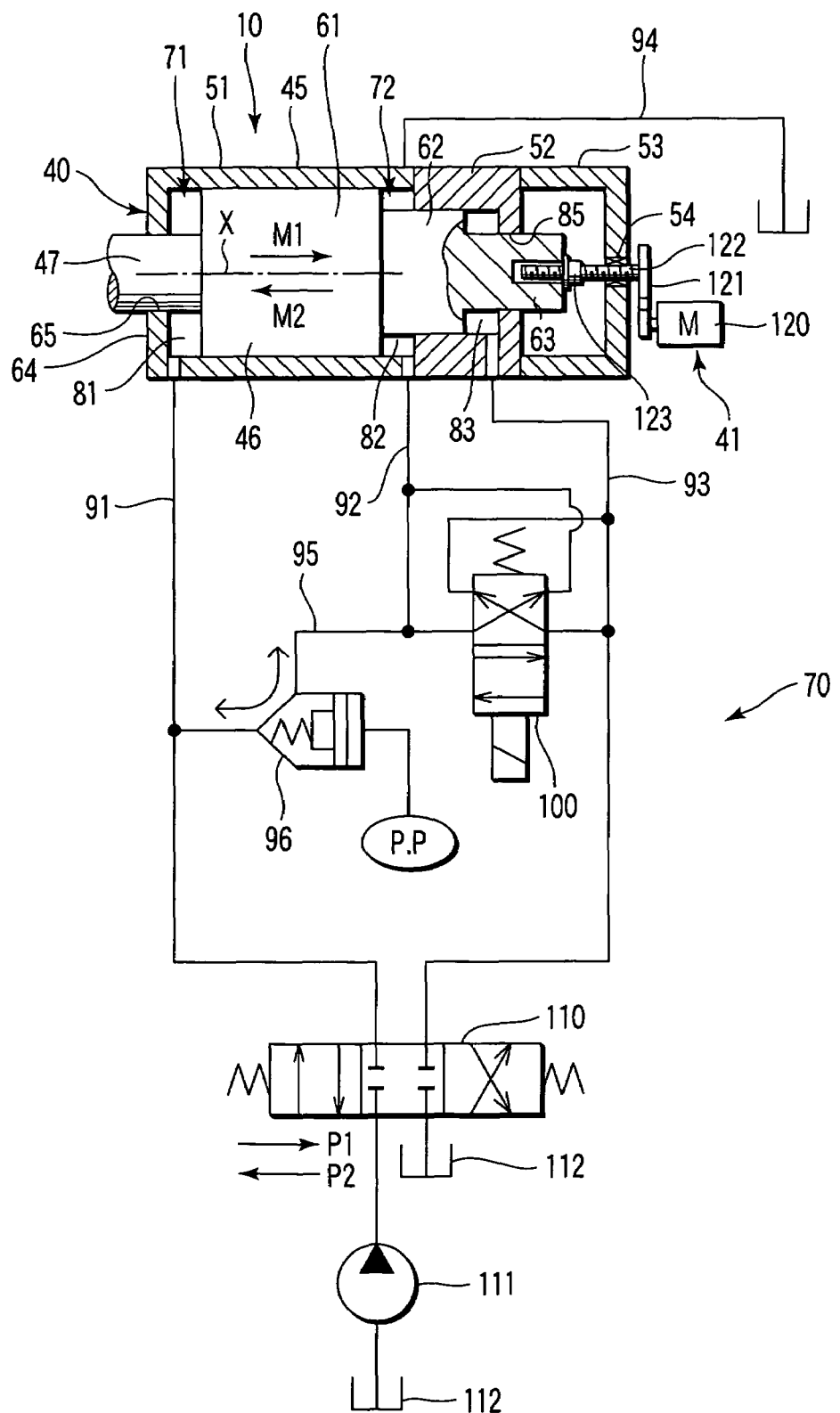
FIG. 2 is a diagram showing a profile of a cylinder mechanism of the die drive unit shown in FIG. 1 and a hydraulic circuit.

FIG. 2 shows a hydraulic circuit 70 of the cylinder mechanism 40. The cylinder mechanism 40 has first and second pressure generating portions 71 and 72, which are situated on the left- and right-hand sides, respectively, of the first piston 61 shown in FIG. 2.

The first pressure generating portion 71 is defined by a pressure receiving surface on one side (left-hand side in FIG. 2) of the piston member 46 and the inner surface of the cylinder body 45. Its capacity increases as the piston member 46 moves in the first direction M1. The second pressure generating portion 72 is defined by a pressure receiving surface on the other side (right-hand side in FIG. 2) of the piston member 46 and the inner surface of the cylinder body 45. Its capacity is reduced as the piston member 46 moves in the first direction M1.

The first pressure generating portion 71 is formed of one oil chamber (first oil chamber 81 only). The second pressure generating portion 72 includes a plurality of oil chambers (second and third oil chambers 82 and 83). More specifically, the interior of the first cylinder portion 51 is divided into the first and second oil chambers 81 and 82 by the first piston 61. The second piston 62 is inserted in the second cylinder portion 52. The shaft portion 63 projects toward the support member 53 through a hole 85 that is formed in the second cylinder portion 52. A third oil chamber 83 is formed in the second cylinder portion 52.

The piston pressure receiving area of the first oil chamber 81 is substantially equal to the sum of those of the second and third oil chambers 82 and 83.

Further, the hydraulic circuit 70 includes a first oil passage 91 connected to the first oil chamber 81, a second oil passage 92 connected to the second oil chamber 82, a third oil passage 93 connected to the third oil chamber 83, a drain pipe 94, etc. The first and second oil passages 91 and 92 communicate with each other by means of a differential oil passage 95. A logic valve 96 is provided in the middle of the differential oil passage 95.

The on-off operation of the logic valve 96 is controlled by a pilot pressure. The logic valve 96 is closed if the pilot pressure is applied, for example, and the valve 96 opens if the pilot pressure is removed. When the logic valve 96 opens, the first and second oil passages 91 and 92 communicate with each other. When the valve 96 closes, the oil passages 91 and 92 are cut off from each other.

The second and third oil passages 92 and 93 are connected with a directional control valve 100 that is driven by, for example, a solenoid. The directional control valve 100 can switch the passage so that the second and third passages 92 and 93 are cut off from each other when the solenoid is not excited and that they communicate with each other when the solenoid is energized, for example. The first and third oil passages 91 and 93 are individually connected to a hydraulic pump 111 through a directional control valve 110. Numeral 112 denotes a tank that stores oil.

The additional drive mechanism 41 is composed of a servomotor 120 that serves as a drive source other than a hydraulic one, a ball screw 122 that converts the rotation of the servomotor 120 into axial power through a power transmission mechanism 121. The ball screw 122 is in threaded engagement with a nut member 123 on the shaft portion 63 of the piston member 46.

The additional drive mechanism 41 can move the piston member 46 in the first and second directions M1 and M2. Thus, if the ball screw 122 is rotated in a first direction by the servomotor 120, the piston member 46 moves in the first direction M1. The first direction M1 is the closing direction of the moving die 16. If the ball screw 122 is rotated in a second direction by the servomotor 120, the piston member 46 moves in the second direction M2. The second direction M2 is the opening direction of the moving die 16.

The following is a description of the operation of the injection molding machine 11 that is provided with the die drive unit 10 described above.

In opening the moving die 16, the lock member 27 is disengaged from the engaging portion 26 of each tie bar 25 by the actuator 28. If the moving platen driving motor 30 is rotated in this state, the moving platen 13 is moved in the direction of arrow A of FIG. 1. As this is done, the moving die 16 separates from the fixed die 15.

In moving the moving die 16 in the closing direction, the lock member 27 is caused to engage the engaging portion 26 of each tie bar 25 by the actuator 28. As this is done, each tie bar 25 is axially moved at high speed by the additional drive mechanism 41 so that the lock member 27 can engage with the engaging portion 26 in a given position. Thereafter, the lock member 27 is caused to engage with the engaging portion 26 by the actuator 28. The moving platen 13 is moved in the direction of arrow B by reversely rotating the moving platen driving motor 30 in this state. Then, the moving die 16 is stopped at a position in which a slight gap G is formed between itself and fixed die 15.

Thereafter, the material is injected into the cavity 17 through the injection nozzle 19. After the cavity 17 is filled with the material, a passage of the directional control valve 110 shown in FIG. 2 is shifted to a first position P1. Thereupon, a working fluid that is compressed by the pump 111 is fed into the first oil passage 91 through the directional control valve 110.

The pressure of the working fluid fed into the first oil passage 91 acts on the first oil chamber 81, and the working fluid pressure acts on the second oil chamber 82 via the differential oil passage 95 and the second oil passage 92. Accordingly, a differential pressure corresponding to the difference between the respective piston pressure receiving areas of the first and second oil chambers 81 and 82 is generated, whereupon the piston member 46 moves in the first direction M1. As this is done, the working fluid in the second oil chamber 82 is returned to the first oil chamber 81 through the differential oil passage 95 and the first oil passage 91. Thus, the amount of working fluid supplied from the pump 111 to the first oil chamber 81 can be reduced. The working fluid in the third oil chamber 83 is returned to the tank 112.

As the piston member 46 is moved in the first direction M1 by the working fluid supplied to the first oil chamber 81, the material having so far filled the cavity 17 is pressed at high pressure, whereupon the gap G shown in FIG. 1 is reduced. Thereafter, the material is molded into a molded product with a given shape in pressure-maintaining and cooling processes.

In a mold-opening process, thereafter, the passage is switched by shifting the directional control valve 110 to a second position P2, and the working fluid from the pump 111 is fed into the third oil chamber 83 through the third oil passage 93. By doing this, the piston member 46 is moved in the second direction M2. As this is done, the working fluid in the first oil chamber 81 is pushed out into the first oil passage 91 by the first piston 61 and recovered into the tank 112 through the first oil passage 91. Further, some of the working fluid flows through the logic valve 96 into the second oil chamber 82.

When the piston member 46 moves in the second direction M2, the tie bars 25 also move in the second direction M2. Since the moving platen 13 also moves in the same direction, the moving die 16 moves in the opening direction. Thereafter, the lock member 27 is disengaged from the engaging portion 26 of each tie bar 25 by means of the actuator 28. By rotating the moving platen driving motor 30, the moving platen 13 is moved at high speed for a long stroke in the die-opening direction (indicated by arrow A in FIG. 1). The space between the fixed die 15 and the moving die 16 is considerably widened by doing this, whereupon the molded product can be taken out of the cavity 17.

Figure 3:
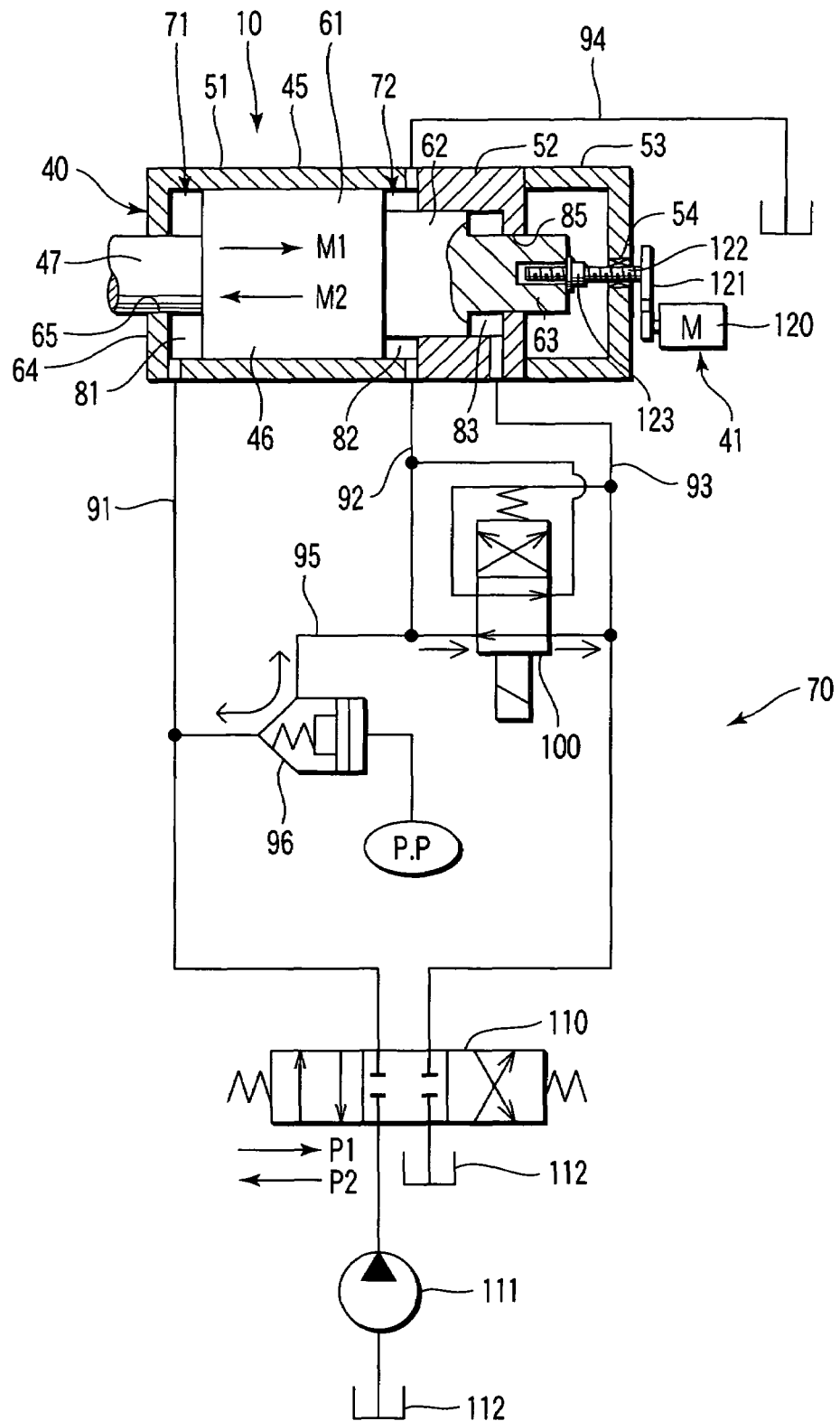
FIG. 3 is a diagram showing the way the passage of a directional control valve of the hydraulic circuit shown in FIG. 2 is switched.

Referring now to FIGS. 2 and 3, it will be described how the piston member 46 is driven in the first or second direction M1 or M2 by the additional drive mechanism 41. In moving the piston member 46 in the first direction M1 by the additional drive mechanism 41, the passage of the directional control valve 100 is switched in the manner shown in FIG. 3 by energizing the solenoid of the valve 100. Thereupon, the second and third oil passages 92 and 93 communicate with each other. Since the logic valve 96 is open, the first and second oil passages 91 and 92 communicate with each other.

If the servomotor 120 is then actuated to rotate the ball screw 122, the piston member 46 is driven in the first direction M1. As the capacity of the first oil chamber 81 then increases, the working fluid in the second oil chamber 82 flows through the differential oil passage 95 into the first oil chamber 81. Further, the working fluid in the third oil chamber 83 flows through the directional control valve 100 into the first oil chamber 81. The piston pressure receiving area of the first oil chamber 81 is equal to the sum of those of the second and third oil chambers 82 and 83. If the piston member 46 moves in the first direction M1, therefore, the total amount of the working fluids in the oil chambers 81, 82 and 83 makes no substantial change. Thus, suction of the working fluid from the tank can be obviated or reduced.

Also in reversely rotating the servomotor 120 to drive the piston member 46 in the second direction M2, the passage of the directional control valve 100 is previously switched in the manner shown in FIG. 3 by energizing the solenoid of the valve 100. As the capacity of the first oil chamber 81 is reduced when the piston member 46 is moved in the second direction M2 by the additional drive mechanism 41, some of the working fluid in the first oil chamber 81 flows through the differential oil passage 95 into the second oil chamber 82. Further, some of the working fluid in the first oil chamber 81 flows through the directional control valve 100 into the third oil chamber 83.

Thus, the total amount of the working fluids in the oil chambers 81, 82 and 83 makes no substantial change even when the piston member 46 moves in the second direction M2. Thus, suction of the working fluid from the tank can be obviated or reduced.

Even if the first oil chamber 81 is designed so that its piston pressure receiving area is equal to the sum of those of the second and third oil chambers 82 and 83, a slight excess or deficiency of the working fluid amount sometimes may be actually caused by a working error of the cylinder mechanism 40 or the like. In this case, the excess or deficiency of the working fluid amount can be coped with by feeding into or discharging the working fluid from the second oil chamber 82 through the drain pipe 94.

In the present embodiment, the first and second oil chambers 81 and 82 with different piston pressure receiving areas are caused to communicate with each other by the differential oil passage 95. Further, the working fluid in the second oil chamber 82 is run into the first oil chamber 81 when the piston member 46 is driven in the first direction M1. Therefore, the amount of the working fluid supplied from the pump 111 to the first oil chamber 81 can be reduced. Since the capacity of the third oil chamber 83 can be reduced, moreover, the amount of the working fluid that is supplied to the third oil chamber 83 when the piston member 46 is moved in the second direction M2 can be reduced, so that the pump 111 used need not have a large capacity.

Figure 4:
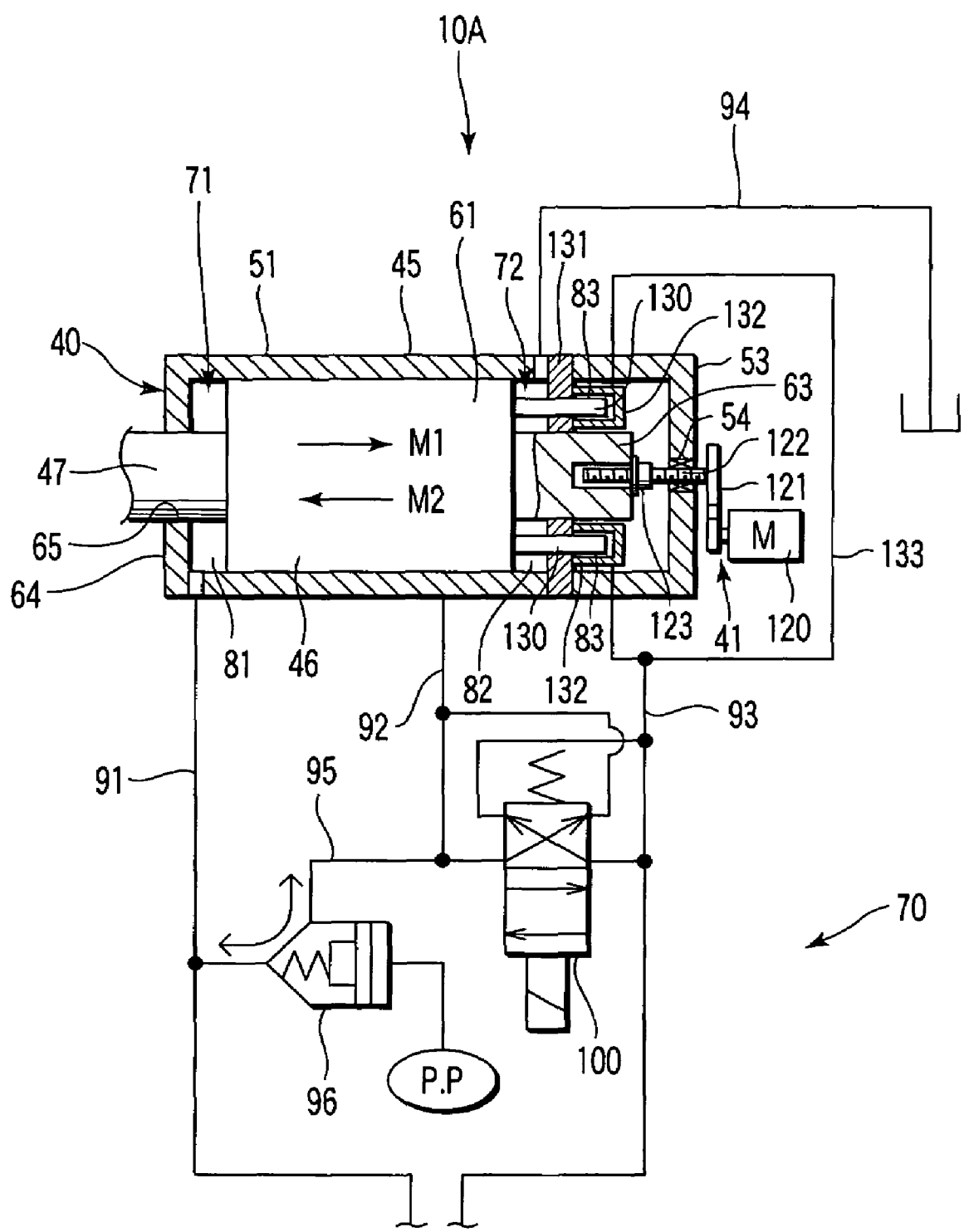
FIG. 4 is a diagram showing a profile of a cylinder mechanism of a die drive unit according to a second embodiment of the invention and a hydraulic circuit.

A second embodiment of the present invention will now be described with reference to FIG. 4. A piston member 46 of a die drive unit 10A shown in FIG. 4 has a first piston 61 and a plurality of second pistons 130 fixed to the first piston 61. These second pistons 130 are inserted into auxiliary cylinders 132, individually, through a partition wall 131 of a cylinder body 45. Third oil chambers 83 are defined in the auxiliary cylinders 132, individually. These third oil chambers 83 communicate with each other by means of an oil passage 133. Since the die drive unit 10A of the second embodiment shares other configurations with the unit of the first embodiment, common numerals are used to designate common portions of the two embodiments, and a repeated description of those portions is omitted.

Figure 6:
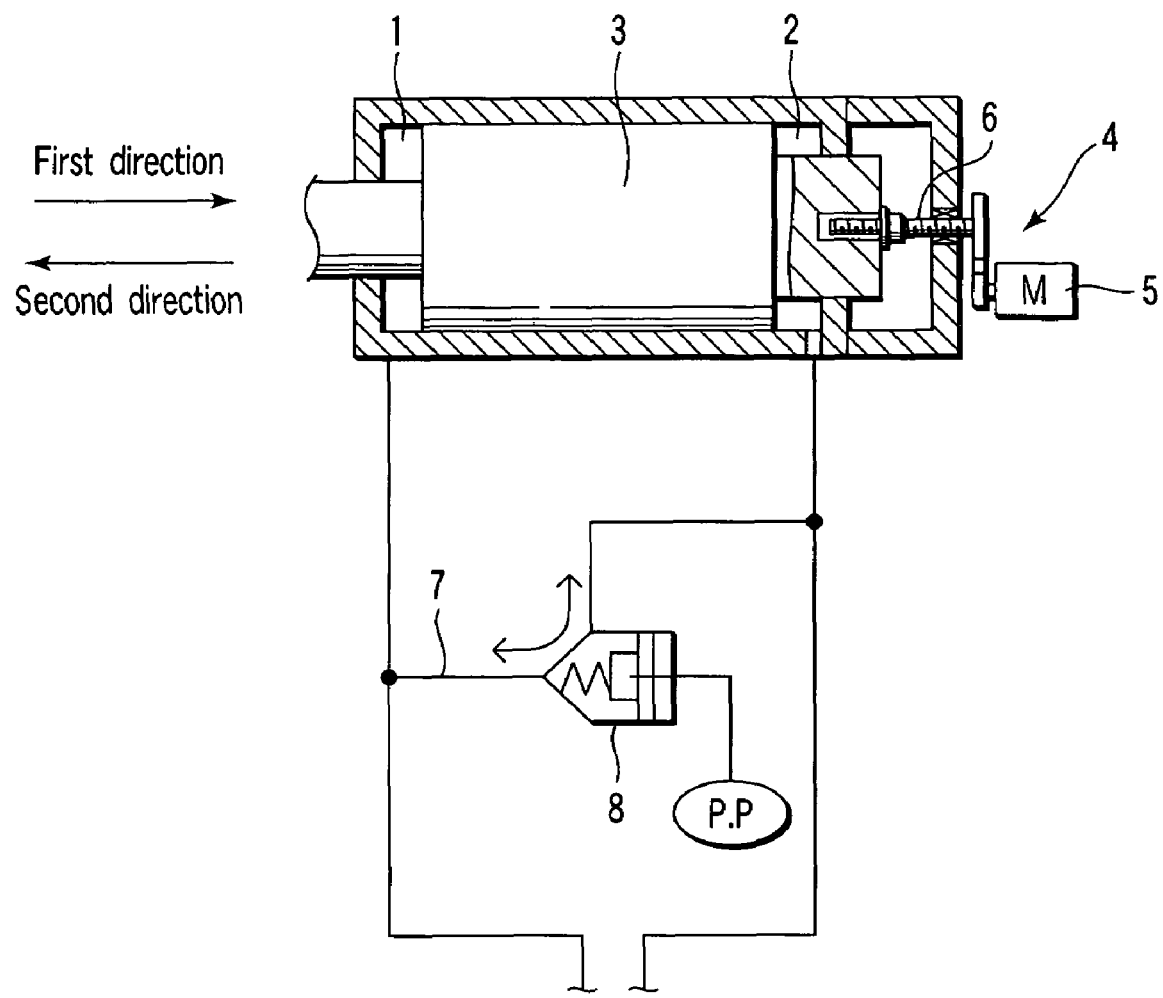
FIG. 6 is a diagram showing a profile of a cylinder mechanism of a conventional die drive unit and a hydraulic circuit.

Also in the die drive unit 10A of the second embodiment, the piston pressure receiving area of a first oil chamber 81 is equal to the sum of those of second and third oil chambers 82 and 83. Therefore, the second embodiment can provide the same functions and effects as those of the first embodiment. In addition, the die drive unit 10A of the second embodiment can be formed by adding the second pistons 130 and the auxiliary cylinder 132 to the piston member of a conventional cylinder mechanism (e.g., cylinder mechanism shown in FIG. 6). Thus, the conventional cylinder mechanism can be favorably utilized to reduce the cost.

Figure 5:
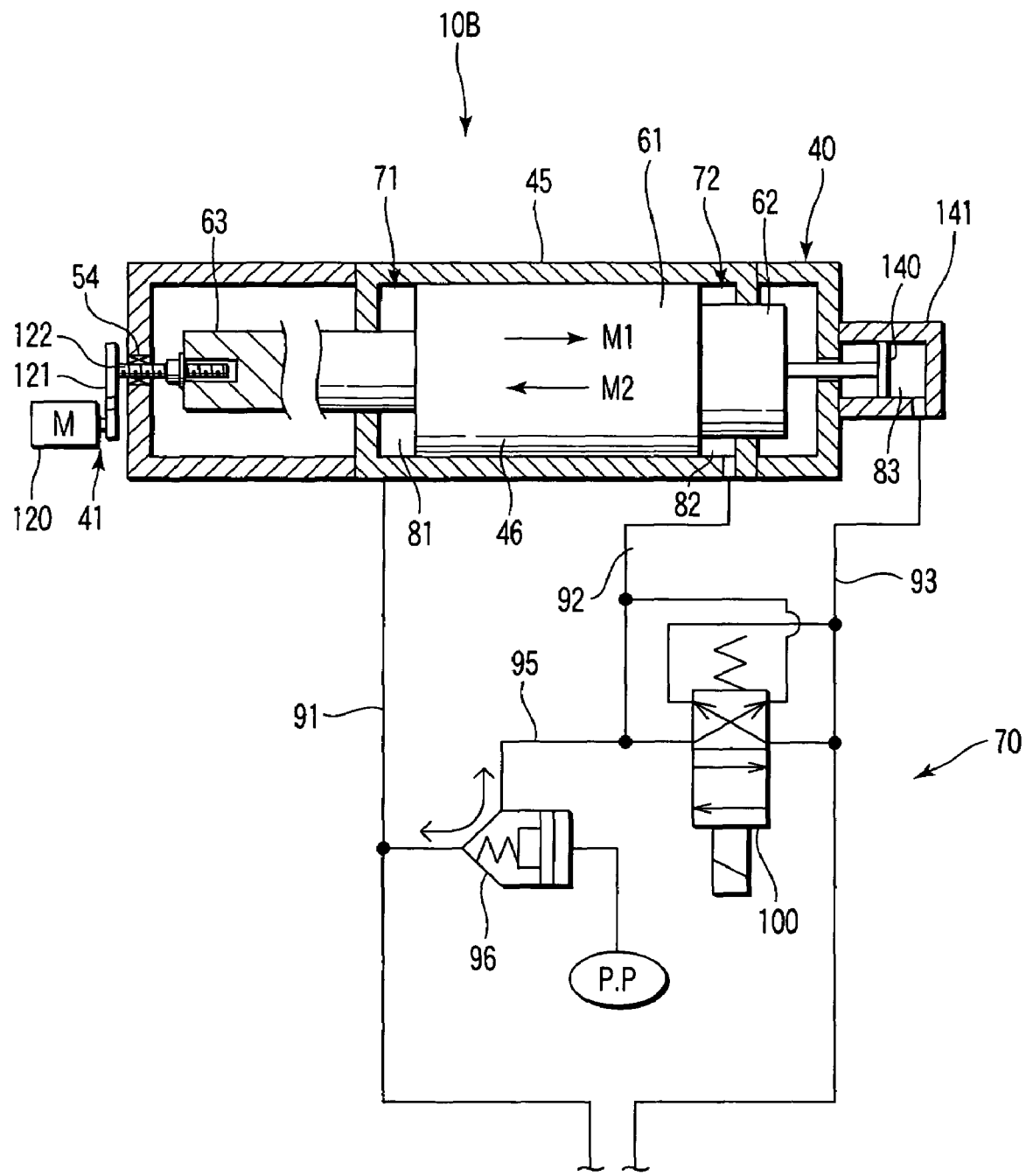
FIG. 5 is a diagram showing a profile of a cylinder mechanism of a die drive unit according to a third embodiment of the invention and a hydraulic circuit.

FIG. 5 shows a third embodiment of the present invention. In a die drive unit 10B of this embodiment, a second piston 62 is formed on one end portion of a first piston 61, and a shaft portion 63 on the other end portion of the piston 61. A piston member 46 of this embodiment can be also moved in the first and second directions M1 and M2 by an additional drive mechanism 41 that is driven by a servomotor 120. A third piston 140 is attached to an end portion of the second piston 62. The third piston 140 is inserted in an auxiliary cylinder 141 that is provided on a cylinder body 45. Since the die drive unit 10B of the third embodiment shares other configurations with the unit of the first and second embodiments, common numerals are used to designate common portions of first to third embodiments, and a repeated description of those portions is omitted.

Also in the die drive unit 10B of the third embodiment, the piston pressure receiving area of a first oil chamber 81 is equal to the sum of those of second and third oil chambers 82 and 83. Therefore, the third embodiment can provide the same functions and effects as those of the first and second embodiments. If the piston pressure receiving area of the first oil chamber 81 is fully equal to the sum of those of the second and third oil chambers 82 and 83, the drain pipe 94 described in connection with the first and second embodiments may be omitted.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A die drive unit having a cylinder mechanism for driving a moving die of a molding machine, the cylinder mechanism comprising:

a cylinder body;

a piston member housed in the cylinder body and movable along an axis of the cylinder body in a first direction and a second direction opposite thereto;

a first pressure generating portion including a first oil chamber defined by a first pressure receiving surface of the piston member and the inner surface of the cylinder body and configured so that the capacity of the first oil chamber increases as the piston member moves in the first direction;

a second pressure generating portion including a second oil chamber and a third oil chamber defined by a second pressure receiving surface of the piston member and the inner surface of the cylinder body and configured so that the capacity of the second and third oil chambers is reduced as the piston member moves in the first direction, wherein the third oil chamber is pressurized in order to open the moving die in the second direction; and a differential circuit including an oil passage connecting the first oil chamber and the second oil, the differential circuit configured to:

cause oil to flow from the second oil chamber into the first oil chamber when the piston member is moved in the first direction, and cause the oil to flow from the first oil chamber into the second oil chamber when the piston member is moved in the second direction.

2. A die drive unit according to claim 1, wherein the cylinder mechanism comprises an additional drive mechanism configured to drive the piston member in the first and second directions by means of a drive source other than a hydraulic one.

3. A die drive unit according to claim 2, wherein the piston pressure receiving area of the first oil chamber is equal to the sum of those of the second oil chamber and the third oil chamber.

* * * * *